United States Patent

[11] 3,580,616

| [72] | Inventor | Joseph Merkwacz<br>Penfield, N.Y. |
|---|---|---|
| [21] | Appl. No. | 850,983 |
| [22] | Filed | Aug. 18, 1969 |
| [45] | Patented | May 25, 1971 |
| [73] | Assignee | Garlock Inc.<br>Palmyra, N.Y.<br>Continuation-in-part of application Ser. No. 666,870, Sept. 11, 1967, now abandoned. |

[54] REINFORCED EXPANSION
6 Claims, 3 Drawing Figs.

[52] U.S. Cl. ............................................. 285/229, 285/235
[51] Int. Cl. ..................................... F16l 27/10, F16l 51/00
[50] Field of Search.......................................... 285/229, 235; 138/132, 129, 138, (Digest)

[56] References Cited
UNITED STATES PATENTS

| 1,352,740 | 9/1920 | Egerton........................ | 138/132 |
| 1,696,435 | 12/1928 | Fraley.......................... | 138/138X |
| 2,135,057 | 11/1938 | Slayter et al..138/(Glass Fiber Digest) |
| 2,998,986 | 9/1961 | Buono........................... | 285/229 |
| 3,051,512 | 8/1962 | Cranston...................... | 285/229X |
| 3,320,977 | 5/1967 | Weil............................. | 138/129 |
| 3,363,918 | 1/1968 | Fisher.......................... | 285/229 |

FOREIGN PATENTS

| 952,739 | 3/1964 | Great Britain................ | 285/229 |

*Primary Examiner*—Thomas F. Callaghan
*Attorney*—Robert Henderson

ABSTRACT: Cylindrical portions of an expansion joint, at opposite sides of an expansible arch of the joint, have reinforcing means integral therewith in the form of a spaced-turn coil of glass-fiber cord embedded within a cylindrical mass of flexible rubber. The rubber prevents interengagement of the turns of the coil and enables the joint's cylindrical portions to expand and contract axially. The coiled cord strongly opposes radial expansion of said cylindrical portions from internal pressure.

PATENTED MAY 25 1971　　3,580,616

INVENTOR:
JOSEPH MERKWACZ

BY Robert Henderson

ATTORNEY 3,580,616

REINFORCED EXPANSION

This application is a continuation-in-part of application Ser. No. 666,870 filed Sept. 11, 1967 and now abandoned.

An important object of this invention is the provision of an arch-type expansion joint having improved means for opposing rupture thereof from high fluid pressure therein.

Another important object is the provision of such a joint having an improved capability of resisting corrosion from fluids carried within the joint.

Another important object is the provision of such a joint which is more flexible axially and lighter in weight than more conventional joints.

Still another important object is the provision of such a joint that can be economically manufactured.

A preferred embodiment of this invention is illustrated in the accompanying drawing without, however, limiting the invention to that particular embodiment. In the drawing.

Figure 1:
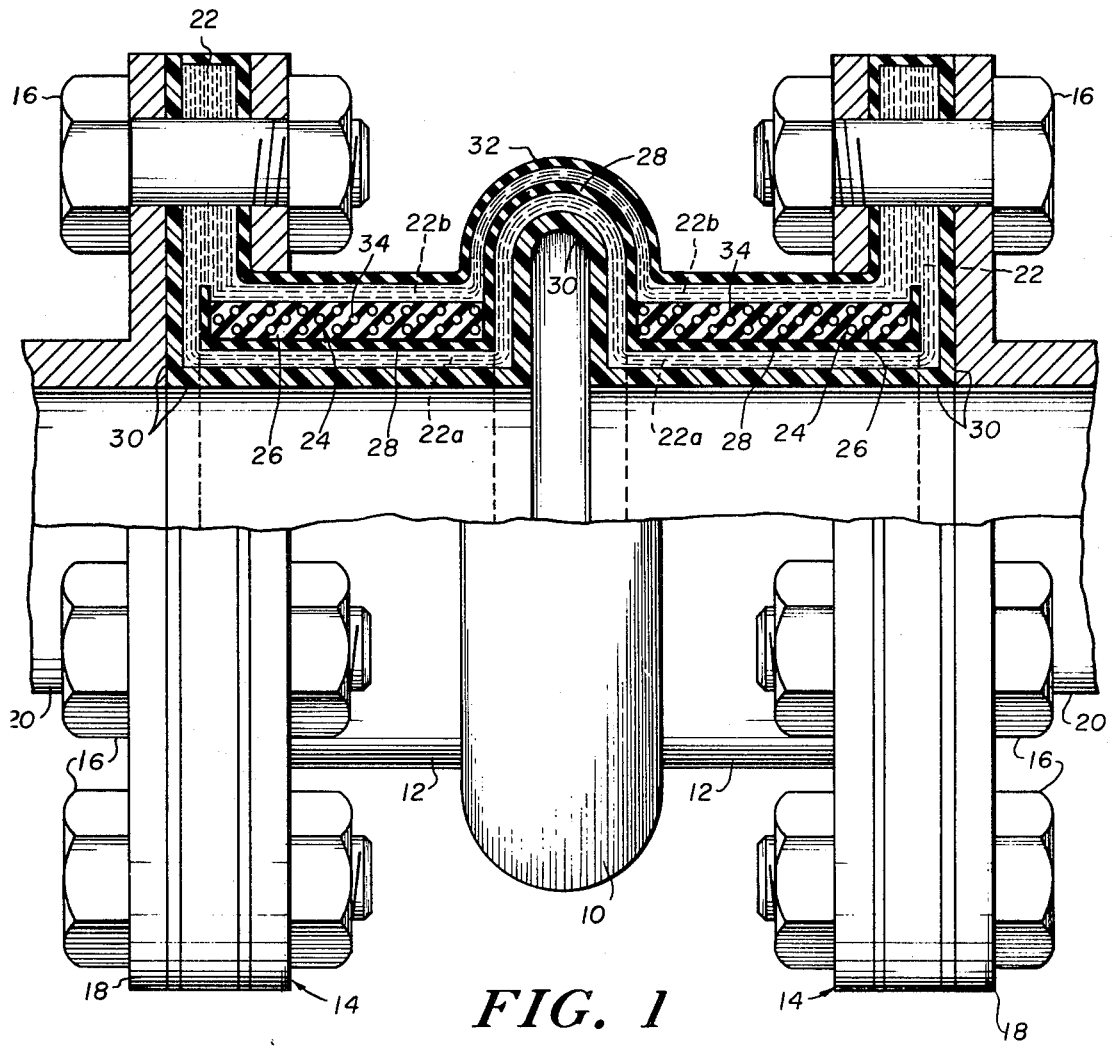
FIG. 1 is a side view of the expansion joint as connected between the ends of fragmentarily shown pipes, the lower part of this figure being in elevation and the upper part being in radial axial section.

An expansion joint of the character to which this invention relates must be capable of expansion and contraction axially as pipes which it interconnects expand and contract due to temperature changes therein. Additionally, such a joint must be strong enough to withstand high internal fluid pressure (and, sometimes, relatively high external pressure) without breaking down. Axial expansion and contraction occurs principally at the joint's arch and breakdown is most likely to occur due to dislocation of parts from pressure effective internally at the juncture of the arch and the mentioned cylindrical portions of the joint.

This invention is directed primarily to the prevention of such dislocations while giving said cylindrical portions of the joint increased axial flexibility and adequate strength to withstand radially effective fluid pressure to which the joint is subjected.

The principal parts of the illustrated expansion joint are a central, annular expansion arch 10, fluid-tightly connected by cylindrical portions 12 to radially extending connection flanges 14 which are connected by bolts 16 to the connection flanges 18 of two related pipes 20.

The arch 10, cylindrical portions 12, and connection flanges 14 consist chiefly of plural plies 22 of suitable, strong, rubber-impregnated fabric material (the term "rubber" being employed throughout this specification and the accompanying claims to comprehend all suitable elastomeric materials).

Completely embedded in the cylindrical portions 12, between inner plies 22a and outer plies 22b of the fabric, are similar reinforcing means comprising spaced-turn reinforcing coils of cord 24 of glass fiber, which coils extend axially from the junctures of the arch 10 with the cylindrical portions 12 to points substantially distal from said junctures, preferably to the junctures of said cylindrical portions with the joint's connection means shown in the drawing as flanges 14.

The turns of the coiled cord 24 in each cylindrical portion 12 are separated by rubber of a flexible cylindrical mass 26 in which the cord is embedded. Optionally, the joint may include interior layers or plies 28 of flexible rubber disposed within and integral with the rubber masses 26 and extending within the arch 10 and into the connection flanges 14, between inner and outer plies 22a and 22b of the fabric.

The expansion joint is normally and preferably made with an homogeneous, impervious lining 30 to protect other parts of the joint from being affected through action of the contained fluid. Said lining may particularly advantageously be made of fluorinated ethylene propylene or equivalent fluorocarbon plastic material to provide protection for other parts of the joint even where strongly corrosive fluids may be carried through the joint.

Pursuant to common practice, the joint is provided with an outer skin or coat 32 of rubber to protect the underlying fabric and to give the joint a smooth exterior surface.

At the commencement of forming of the disclosed joint, all the rubber, including the impregnant of the fabric, is in an uncured state.

The joint may be formed by applying the various constituents of the joint upon a suitably shaped mandrel. The lining 30, inner plies 22a of fabric, and the layer 28 of rubber (if said layer is to be employed), are first applied to the mandrel, whereafter coils of glass fiber cords 24 are to be incorporated into the formative joint structure.

At this point should be noted the importance of keeping the turns of the coiled glass fiber cord separated. If not separated, rubbing and chafing of turns of glass fiber on one another would be caused by flexing and by expansion and contraction of the joint from changing pressure and temperature conditions. Such rubbing would quickly cause the glass fiber cords to break down and lead to early failure of the joint.

Figure 2:
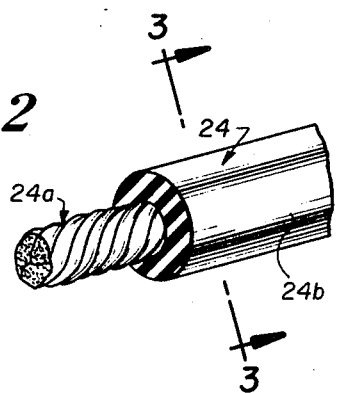
FIG. 2 is a perspective view of a fragmentary length of elastomer-covered glass-fiber cord such as is suitable for use in practicing this invention.
Figure 3:
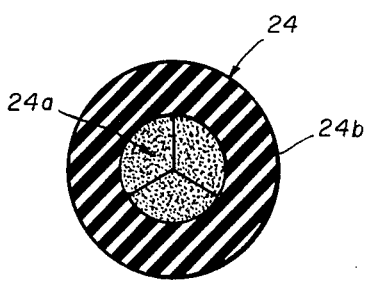
FIG. 3 is a cross-sectional view, on the line 3-3 of FIG. 2, of the elastomer-covered glass-fiber cord.

Assurance of keeping the turns of cord 24 separated may be realized by providing that, before being coiled, the cord 24, as illustrated in FIGS. 2 and 3, comprises a core 24a of one or more axially continuous helically twisted strands of glass fiber, encased within a thick sheath 24b of rubber. This rubber sheathed cord of glass fiber is intimately wound in place in the cylindrical portions 12, overlying portions of inner fabric plies 22a and portions of the layer 28 if the latter is provided.

The winding of the rubber-sheathed glass-fiber cord 24 may be in one or more layers, depending upon the size and desired strength characteristics of the finished joint. If plural layers of this winding are desired, the winding should preferably proceed in a back and forth manner so that the entire winding at each side of the arch 10 will consist of a single, continuous length of the cord with the turns of the several layers of cord in staggered relationship as illustrated.

It is preferred that the strands constituting the core 24a be formed of twisted glass threads which, themselves, are formed of twisted glass filaments or yarns which are rubber-coated to oppose undesirable, weakening rubbing and chafing of yarns, filaments, threads and strands on one another.

After completion of the winding of the sheathed cords 24, further layers of rubber-impregnated fabric are applied as the outer plies 22b, followed by the application of rubber to form the outer rubber coat 32. Then, the thus built-up structure is suitably cured while being confined to its desired form and dimensions.

The curing causes fusing of adjacent turns and layers of rubber and of rubber impregnant in the fabric so that, as a result of such curing, the thick rubber coat 24b of the coil of glass-fiber cord 24 becomes a homogeneous mass of rubber as shown at 26 in FIG. 1 and becomes fused to the strands of core 24a, to adjacent parts of the rubber layer 28 and to the rubber impregnant of adjacent outer plies 22b of fabric. Similarly, the rubber coat 32 fuses with the rubber impregnant in the underlying fabric; and the impregnant in adjacent plies of fabric also fuses.

Thus, the curing has the effect of interfusing the various parts of the joint into a well-bonded expansion joint unit. If the layer 28 of rubber is employed, it enhances bonding between the rubber mass 26 and the inner plies 22a of fabric and between the latter plies and the outer plies 22b of fabric. Experience indicates, also, that the presence of the rubber layer 28 within the arch 10 has the effect of desirably contributing to the flexibility of the arch without impairing the latter's capacity to withstand high internal pressure.

It is known that where separate steel reinforcing rings are employed in cylindrical portions of arch type expansion joints, as shown, for example in Fraley U.S. Pat. No. 1,696,435, internal fluid pressure effective axially and radially at the juncture of the arch and the adjoining cylindrical portions of the joint causes at least the innermost of said steel rings to migrate within the joint and causes the joint to break down.

Comparative tests and experience with arch-type expansion joints, having various types of reinforcing means, show that joints as disclosed herein are very highly resistant to rupture and breakdown under high internal pressure. This advantageous result appears to arise from the use of the coils, at opposite sides of the arch, of the glass-fiber cord 24, the turns of which are substantially separated by the rubber of the mass 26.

The improved results derived from this invention may arise from several conditions as will now be explained.

First; it is to be noted that glass-fiber cord possesses high tensile strength and very low stretch capability so that the coils 24 provide very substantial opposition to dilation of the cylindrical portions 12 under high internal pressure.

Second; the coils of the cord 24 extend into the junctures of the arch and the two cylindrical portions where, experience shows, reinforcement is most needed.

Third; the rubber mass 26 is very substantially confined by the adjacent fabric material so that said mass of rubber and the spaced-turn coil 24 of glass-fiber cord embedded therein constitutes an axially flexible reinforcing unit which is firmly held against undesirable migration by being unified or bonded to adjacent fabric at all surfaces of that unit.

Fourth; because of the mentioned strict confinement of the rubber mass 26, it cannot become materially distorted; hence, there is no condition tending to dislodge any part of the coil 24 from its proper position within that mass. In the absence of such dislodgement, parts of the coils 24 remain firmly in place in the junctures of the arch 10 and the cylindrical portions 12 where reinforcement is most needed.

Fifth; as the turns of the coil 24 of glass-fiber cord are substantially spaced by intervening flexible rubber and as the rubber mass 26 is firmly bonded in place within the joint, the reinforcing means are in the nature of integral parts of the joints cylindrical portions 12 and are free to expand and contract axially therewith. Thus there is no material tendency for any part or parts related to said cylindrical portions to migrate within the latter, so that rupture and breakdown of the joint is avoided.

I am aware that tightly coiled wire has hitherto been suggested for use in reinforcing means of expansion joints. However, in such arrangements, the coiled wire, with no spacing between turns thereof, constituted a substantially solid, nonflexible, steel hoop which was not materially held against harmful, breakdown-causing migration.

I am aware, also, that tight windings of glass-fiber material have been suggested for use in reinforcing means of expansion joints. That suggestion, however, involved the use of a very thin film of adhesive which would harden to constitute the winding as a solid, glass-fiber ring having no capability of expanding and contracting axially as with my present invention, wherein the material between turns of the coiled glass-fiber is flexible rubber of such substantial thickness that the coil is capable of expanding and contracting like a coil spring.

It should be realized that the spacing of the turns of the coil of glass-fiber cord 24 by rubber of the mass 26 should be sufficient to prevent rubbing of said turns on one another in any proper use of the joint and also to provide a suitable measure of flexibility in the joint's cylindrical portions 12.

The flexibility of said portions 12, should be such that they may contract and expand axially with expansion and contraction of pipes which are interconnected by the joint: also, that the portions 12 may flex laterally to facilitate connection of the joint between pipes or ducts which may be somewhat malaligned; and, also, that the portions 12 may contribute to the capacity of the joint to withstand vibrations which may be communicated to it from a pipe or other duct member to which it is connected.

The spacing of the turns of the coil 24 may be achieved by providing the cord or core 24a with a relatively thick sheath 24b of rubber as hereinbefore explained. Such spacing of the coil's turns, however, may be effected in other ways, as, for example, by winding in a cord of solid uncured rubber along with a winding of glass-fiber cord having a rubber sheath which may be of less thickness than hereinbefore disclosed, and described, and/or by providing a cylindrical layer of rubber immediately inside of the outer fabric plies 22b which rubber, upon curing of the joint will, like the rubber of layer 28, fuse with and supplement any sheath rubber on the glass-fiber cord, and/or cylindrical layers of rubber may be placed between plural coiled layers of the glass-fiber cord.

It should also be noted that, if moisture or corrosive fluid were accidentally to find its way to the reinforcing coil 24 through some failure of surrounding or adjacent materials, the glass fiber of which that coil is constituted will not become corroded and weakened as would occur where steel reinforcing means are employed.

It will be apparent, to those familiar with the subject art, that this invention can be practiced in other ways without, however, departing from the invention.

I claim:

1. An expansion joint comprising plural plies of rubber-impregnated fabric, forming a carcass which comprises an annular, axially expansible arch having spaced radial walls defining a radially inwardly facing pressure-containing area, cylindrical portions coaxially adjoining radially inner portions of said walls at opposite sides of said arch, connection means at outer ends of said cylindrical portions for connecting the joint to related pipe portions, and axially flexible reinforcing means fixedly associated with said cylindrical portions; said reinforcing means of each of said cylindrical portions comprising a flexible, cylindrical mass of rubber fused to its related one of said cylindrical portions, an inner end of said mass extending to an adjacent one of said radial walls, and a generally cylindrical spaced-turn coil of glass-fiber cord completely embedded integrally within said mass and extending throughout the greater part of the length of said related cylindrical portion, approximately to said adjacent radial wall and into closely spaced relationship with the extremity of said inner end of said mass; the spacing of the turns of said coil and the flexibility of the rubber of said mass being such that said related cylindrical portion of the joint is capable of expanding and contracting axially without material radial expansion of said related cylindrical portion and without interengagement of the turns of the coil.

2. An expansion joint according to claim 1, said reinforcing means of said cylindrical portions and said coils of said means extending uninterruptedly from said connection means to said radial walls of said arch.

3. An expansion joint according to claim 1 said reinforcing means being disposed between plies of fabric of the walls of said cylindrical portions.

4. An expansion joint according to claim 1, the glass-fiber cord having a sheath of flexible rubber; turns of the sheath being fused to adjacent spaced turns thereof to constitute said mass of rubber.

5. An expansion joint according to claim 1, said coil of glass-fiber cord including plural layers of coiled glass-fiber cord, said layers being spaced radially by intervening rubber of said mass.

6. An expansion joint according to claim 1, said glass-fiber cord of the coil comprising filaments of glass fiber, all of which are rubber-coated to oppose rubbing thereof on one another.

UNITED STATES PATENT OFFICE
CERTIFICATE OF CORRECTION

Patent No. 3,580,616           Dated    May 25, 1971

Inventor(s)   Joseph Merkwacz

It is certified that error appears in the above-identified patent and that said Letters Patent are hereby corrected as shown below:

Title of invention "REINFORCED EXPANSION" should read -- REINFORCED EXPANSION JOINT --.

Signed and sealed this 7th day of March 1972.

(SEAL)
Attest:

EDWARD M. FLETCHER, JR.　　　　　　　ROBERT GOTTSCHALK
Attesting Officer　　　　　　　　　　Commissioner of Patents